(12) United States Patent
García González

(10) Patent No.: US 9,677,827 B2
(45) Date of Patent: Jun. 13, 2017

(54) HEAT EXCHANGER

(71) Applicant: BorgWarner Emissions Systems Spain, S.L.U, Vigo-Pontevedra (ES)

(72) Inventor: Salvador García González, Vigo (ES)

(73) Assignee: BorgWarner Emissions Systems Spain, S.L.U., Vigo-Pontevedra (ES)

( * ) Notice: Subject to any disclaimer, the term of this patent is extended or adjusted under 35 U.S.C. 154(b) by 191 days.

(21) Appl. No.: 14/650,389

(22) PCT Filed: Dec. 5, 2013

(86) PCT No.: PCT/EP2013/075608
§ 371 (c)(1),
(2) Date: Jun. 8, 2015

(87) PCT Pub. No.: WO2014/086902
PCT Pub. Date: Jun. 12, 2014

(65) Prior Publication Data
US 2015/0308757 A1 Oct. 29, 2015

(30) Foreign Application Priority Data
Dec. 7, 2012 (EP) .................................... 12382485

(51) Int. Cl.
| | | |
|---|---|---|
| F28D 7/10 | (2006.01) | |
| F28F 9/02 | (2006.01) | |
| F28D 21/00 | (2006.01) | |
| B23P 15/26 | (2006.01) | |
| F02M 26/32 | (2016.01) | |
| F28D 7/16 | (2006.01) | |

(52) U.S. Cl.
CPC ................. *F28F 9/02* (2013.01); *B23P 15/26* (2013.01); *F02M 26/32* (2016.02); *F28D 21/0003* (2013.01); *F28F 9/0241* (2013.01); *F28D 7/16* (2013.01)

(58) Field of Classification Search
CPC ....... F28F 9/02; F28F 9/0241; F28D 21/0003; F28D 7/16; F02M 26/32
USPC ....................................................... 165/157
See application file for complete search history.

(56) References Cited

U.S. PATENT DOCUMENTS

| 3,494,414 A | 2/1970 | Howard | |
|---|---|---|---|
| 4,127,389 A * | 11/1978 | Hackemesser | .......... C01B 3/384 165/135 |
| 6,206,086 B1 | 3/2001 | McKey | |

(Continued)

FOREIGN PATENT DOCUMENTS

| FR | 1585849 | 1/1970 |
|---|---|---|
| GB | 399690 | 10/1933 |

(Continued)

*Primary Examiner* — Davis Hwu
(74) *Attorney, Agent, or Firm* — Miller Canfield

(57) ABSTRACT

The present invention proposes a new design in the configuration of the attachment between the battery of tubes and the shell of a heat exchanger, improving the manufacturing costs and efficiency with respect to the exchangers of the state of the art. The present invention describes a heat exchanger and a process for manufacturing it, which combines the thermal fatigue strength of floating core exchangers with the compact, simple and more economical design of monoblock exchangers, resulting from, among others, a smaller number of necessary manufacturing steps.

16 Claims, 4 Drawing Sheets

(56) References Cited

U.S. PATENT DOCUMENTS

| | | | | |
|---|---|---|---|---|
| 6,244,333 | B1 * | 6/2001 | Bergh | ................. B01J 19/0093 165/157 |
| 7,458,222 | B2 * | 12/2008 | Orr | ........................ F28D 7/024 165/101 |
| 2004/0226694 | A1 | 11/2004 | Dilley et al. | |
| 2008/0236792 | A1 * | 10/2008 | Mast | ...................... B23P 15/26 165/157 |

FOREIGN PATENT DOCUMENTS

| | | |
|---|---|---|
| GB | 2095389 | 9/1982 |
| NL | 1011503 | 9/2000 |
| WO | 03091650 | 11/2003 |

* cited by examiner

HEAT EXCHANGER

OBJECT OF THE INVENTION

The present invention is comprised in the field of heat exchangers for cooling gases, primarily used in EGR (Exhaust Gas Recirculation) systems so that the gases used to power the engine, which have a low oxygen content and therefore produce lower amounts of nitrogen oxides during combustion, are at a suitable temperature for being reintroduced into the engine intake.

The use of a shell housing a battery of conduits through which the gas to be cooled flows is common in such exchangers. There is a space where the coolant liquid flows between the inner surface of the shell and the battery of conduits. The coolant liquid is in contact with the outer surfaces of the conduits, and the inner surfaces of these conduits making up the battery of conduits are in contact with the hot gas to be cooled.

The present invention proposes a new design in the configuration of the attachment between the battery of tubes and the shell, improving the manufacturing costs and efficiency with respect to exchangers of the state of the art.

BACKGROUND OF THE INVENTION

Two heat exchanger concepts for cooling gases in EGR systems are described in the state of the art.

In monoblock type exchangers, the bundle of tubes is integrally attached to the shell at its ends by means of welding. Its manufacture, therefore, is simple: there is no need for assembling by means of metal joints and O-ring joints, with the subsequent cost savings and size reduction of the exchanger. However, the temperature differences reached by both components in operation give rise to also different degrees of expansion, and since both components are fixed to one another stresses which could cause them to break are produced, thereby reducing the thermal fatigue life of the part.

In turn, the bundle of tubes is independent of the shell in floating core type exchangers. The tubes are welded at each of their ends to a component referred to as a baffle, which in turn are connected to the shell by means of metal joints and O-ring joints. These exchangers solve the thermal fatigue problem in the following manner: one of the baffles is attached to the shell by means of an O-ring joint which assures leak-tightness while at the same time enables the tubes to freely expand at this end in the axial direction. The end at which the O-ring joint is located and at which the bundle of tubes can freely expand is usually the end closest to the entrance of coolant in the shell, because the O-ring joint is made of an elastomeric material that does not withstand such high temperatures like metal does. The greatest difficulty in the design, which is the result of the more complicated geometry of the shell, of the different production steps required by the manufacturing process, such as welding the bundles of tubes and the baffles and the process of assembling them in the shell, and of the high cost of some of the materials, such as the sealing gaskets, means that floating core exchangers are considerably more expensive, up to 20% or 30%, than monoblock exchangers.

The present invention describes a heat exchanger and a process for manufacturing it which combines the thermal fatigue strength of floating core exchangers with the compact, simple and more economical design of monoblock exchangers resulting from, among others, the lower number of necessary manufacturing steps.

DESCRIPTION OF THE INVENTION

To solve the mentioned problems of exchangers of the state of the art and to obtain a solution such as that described in the preceding paragraph, a heat exchanger according to claim 1 has been developed as a first inventive aspect, and a method for manufacturing a heat exchanger according to claim 13 has been developed as a second inventive aspect.

This first inventive aspect defines a heat exchanger comprising a shell suitable for the circulation of coolant therein, with a coolant inlet opening and outlet opening, and a battery with one or more hollow tubes extending according to an axial direction (X) suitable for conducting gas going through said shell and welded thereto at one of its ends, characterized in that at the opposite end of the battery:

- the latter is welded to an independent baffle that is non-contiguous with respect to the shell; and where
- said baffle comprises a first bushing around its perimeter that is non-contiguous with respect to the shell the surface of which opposite the one attached to the baffle is essentially parallel to the axial direction,
- there is a first housing between the surface of the first bushing opposite the one attached to the baffle and the shell such that the access to the first housing is possible according to the axial direction of the exchanger but not according to its radial direction,
- the attachment between the first bushing and the shell is by means of a first joint housed in the first housing defined between the shell and the first bushing, and
- the exchanger comprises a first independent closing part that is non-contiguous with respect to the first bushing, which gives rise to a separation between both, the first closing part preventing the movement of the first joint in the axial direction once this joint is enclosed by at least one inner surface of the first closing part in the housing defined between the shell and the first bushing.

Axial direction is understood as the direction of the longitudinal axis of the tubes forming the battery; an X axis has been defined according to this axial direction. 'Non-contiguous' means 'without contacting' and that, therefore, there is a separation distance.

It is with this design that the present invention achieves a heat exchanger one of the ends of which is a floating end, comprising a joint like in the conventional floating core, but whose structure and manufacturing process differ from those which are usual in these exchangers, and they are similar to monoblock exchangers due to their simplicity and cost savings: in the present invention, at the end at which the tubes cannot freely expand in the axial direction (the fixed end) the battery of tubes is welded directly to one of the walls of the shell instead of being welded to a baffle which, in a later step, is screwed to the shell. At the other end, the floating end, the battery is welded to an independent baffle, but the configuration is also different from floating ends known in the state of the art.

The baffle comprises a first bushing around it the surface of which opposite the one attached to the baffle, its outer surface, is essentially parallel to the axial direction. In turn, the shell comprises at the end called the floating end a first inner corner, shaped such that it defines, together with the surface of the bushing opposite the one attached to the baffle, a first housing which can be accessed axially, i.e., in the direction essentially parallel to the axial direction of the battery of tubes.

The portion of the first housing defined by the first corner of the inner surfaces of the shell and that defined by the outer surface of the first bushing cannot be in direct contact, i.e., they cannot be contiguous, hence the floating nature of this end. This feature, which is characteristic of the floating core exchangers, is what enables the area of tubes of this end to freely expand in the axial direction with respect to the shell. However, unlike the floating core of the state of the art, the particular shape of the first housing described in the preceding paragraph allows to introduce, in the axial direction, a first joint sealing the inside of the shell, joining the inner surfaces of the latter with the first bushing. In the floating core exchangers of the state of the art, the housings for the joints are designed so that the joints are introduced therein in the radial direction of the exchanger, which is also the radial direction of the joints. The shape of the housing prevents the axial movement of the joints, and the bushing prevents the joint from shifting in the radial direction once the joint has been introduced. This configuration used in the state of the art makes it necessary for the joints to be radially deformed to introduce them into the housing, complicating the manufacturing process and subjecting the joints to damaging stresses.

With respect to the other end of the battery of tubes, the non-floating end, there are also differences with respect to the state of the art making it technically advantageous. As stated, in a conventional floating core the non-floating end is welded to a baffle which in turn is screwed to the main body of the shell. In the present invention, however, the fixed end of the battery is welded to the actual end of the shell, or is welded to a second baffle which is in turn welded to the end of the shell. Since the floating end must also be welded to the corresponding baffle in one and the same manufacturing step, preferably consisting of welding in a furnace by means of braze welding, a considerable portion of what will be the final configuration of the part can be obtained, considerably reducing the manufacturing cost and time typically required by assemblies with screws and metal joints in floating core exchangers.

The joint closes the heat exchanger such that its inside is a leak-tight compartment. To that end, a part preventing the axial movement in the opposite direction, i.e., preventing the joint from coming out of the housing, is necessary once the joint has been introduced axially into the housing. This part is the closing part, suitable for its axial coupling to the rest of the exchanger.

In a second inventive aspect, a method for manufacturing heat exchangers such as those defined in the first inventive aspect is defined, comprising the following steps:
  assembling the tubes, the shell, the baffle and the first bushing by means of welding,
  introducing the first joint in the first housing according to the axial direction (X) of the heat exchanger,
  sealing the inside of the shell by means of contacting the first joint with the surface of the first bushing opposite the one attached to the baffle and with an inner surface of the shell, and
  immobilizing the first joint by means of a first closing part, assuring sealing.

This second inventive aspect therefore defines the process whereby an exchanger like that described above is obtained, said process having already discussed advantages: lower costs due to its simplicity compared with conventional floating core exchangers, fewer stresses on the joints in the step of introducing them into the housing, etc.

All the features described in this specification (including the claims, description and drawings) can be combined in any way with the exception of the combinations of such features which are mutually exclusive.

DRAWINGS

FIG. 1 shows a longitudinal section according to the axial axis of the portion of the exchanger which is obtained as a single part after the welding.

FIG. 2 further shows a first joint which is introduced axially into a first housing and the coolant circulation direction between the inlet opening and the outlet opening.

FIG. 3 shows a cross-section of the exchanger, this section crossing the baffle.

FIG. 4 completes FIGS. 1 and 2, further showing a first closing part, the first joint already introduced in the housing, and a screw keeping the shell and the first closing part integrally attached to one another.

DETAILED DESCRIPTION OF THE INVENTION

As indicated in the preceding sections, the present invention describes an exchanger suitable for use in EGR systems, which allows cooling a gas as a result of a coolant flowing around a battery of one or more tubes (2) through the inside of which this gas circulates, such that it comes out of the exchanger at a temperature suitable for reintroducing it into the engine.

Figure 1:
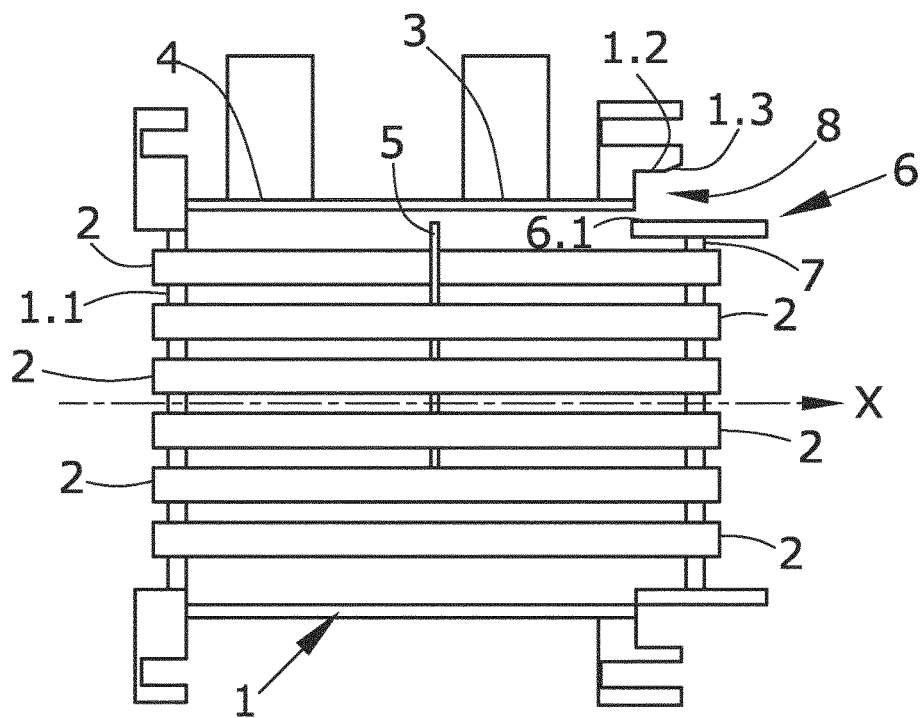
Figure 2:
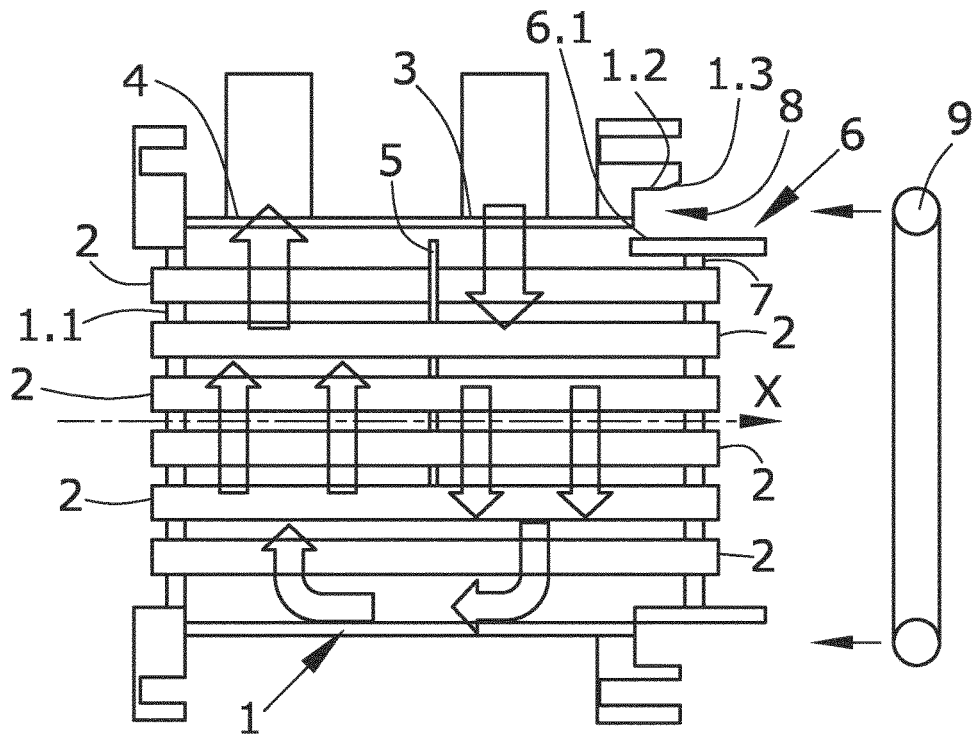

This exchanger has a configuration combining the features of monoblock type exchangers with those of floating core type exchangers. The exchanger comprises a shell (1) housing therein, going through it, a battery with at least one tube (2) through which the gas to be cooled circulates, and a space with an inlet opening (3) and outlet opening (4) for the flow of coolant through the gap between the battery of tubes (2) and the shell (1). The X axis of the exchanger is defined parallel to the longitudinal axis of the tubes making up the battery. In one embodiment, the exchanger further comprises a separation surface (5) that is non-contiguous with respect to the shell forcing the coolant liquid to circulate between the inlet opening (3) and the outlet opening (4), as shown in FIG. 2, flowing around all the tubes (2) of the battery according to a more prolonged U-shaped path. The tubes (2) are welded to the fixed end (1.1) of the shell (1), the left end according to the orientation shown in FIGS. 1, 2, 4, 5, 6 and 7, and to a baffle (7) at the floating end, the right end in these figures. The baffle (7) comprises a first bushing (6) around its perimeter the surface (6.1) of which opposite the surface attached to the baffle (7) is essentially parallel to the axial direction. The baffle (7), the battery of tubes (2), the shell of the exchanger (1) and the first bushing (6) are assembled by welding, preferably braze welding, and in a particular example they form a single part such as that of FIG. 1 in a single manufacturing step.

With respect to the shell (1), it is also observed in the examples shown in the figures that, at the floating end, its inner walls have an L-shaped first corner (1.2) according to a longitudinal section of the exchanger comprising its axis. In that cross-section view, the cross-section of the first bushing (6) is rectangular, and the surface (6.1) of the first bushing (6) opposite the one attached to the baffle (7) defines, together with the first corner (1.2) with an L-shaped cross-section, a first housing (8) in which a first joint (9) can be introduced axially, as indicated by the movement arrows of FIG. 2.

Figure 3:
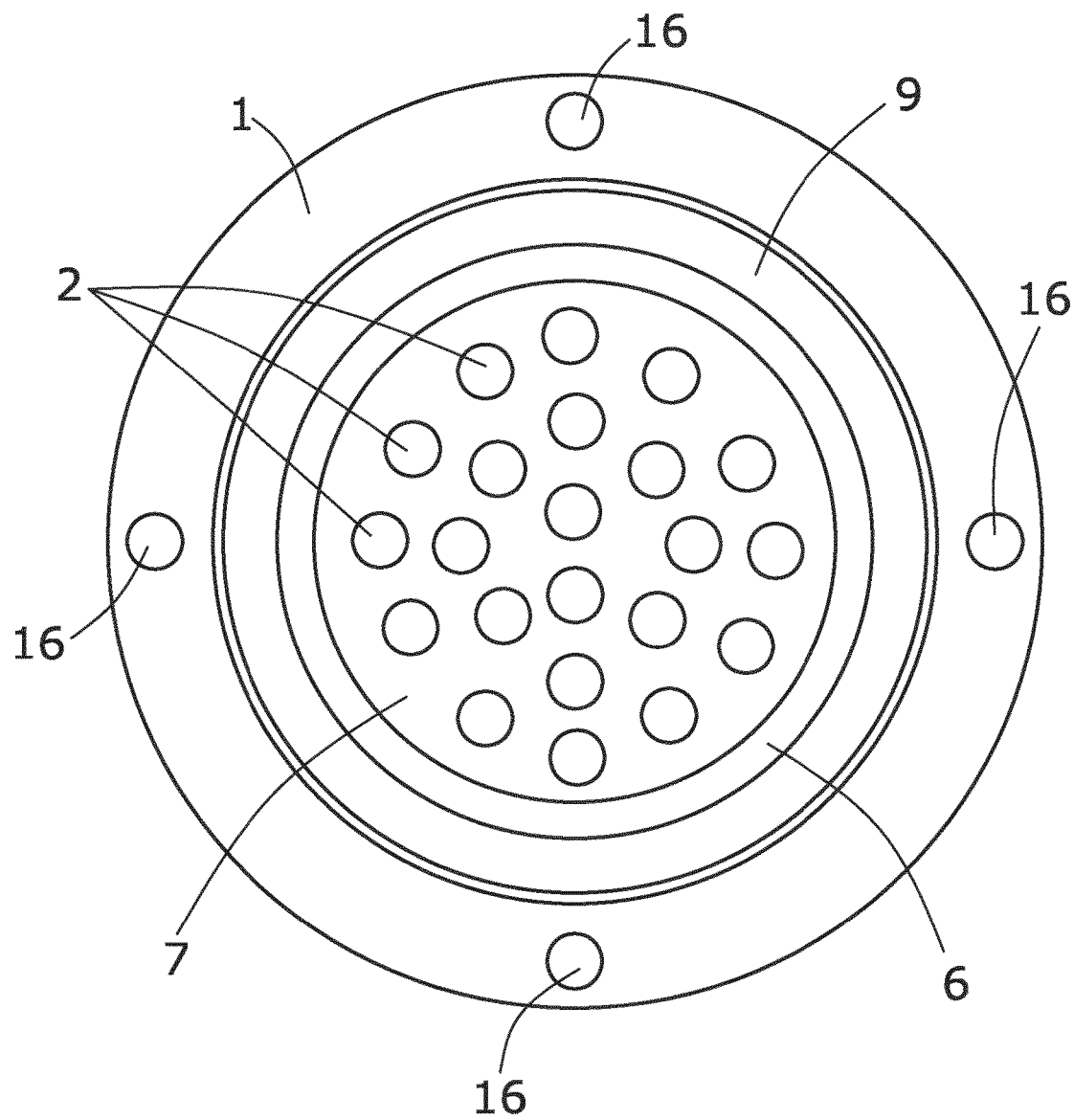

In a preferred embodiment, the baffle (7) is circular in shape and the battery of tubes (2) goes through it according to a section transverse to the exchanger. In this preferred embodiment shown in FIG. 3, the first bushing (6), according to a cross-section, is ring-shaped, and the first joint (9) housed in the housing is an O-ring joint which is therefore also ring-shaped in a view from a section transverse to the exchanger. The outer ring, in this figure, corresponds to the cross-section of the portion of the shell (1) defining the first housing (8).

Figure 4:
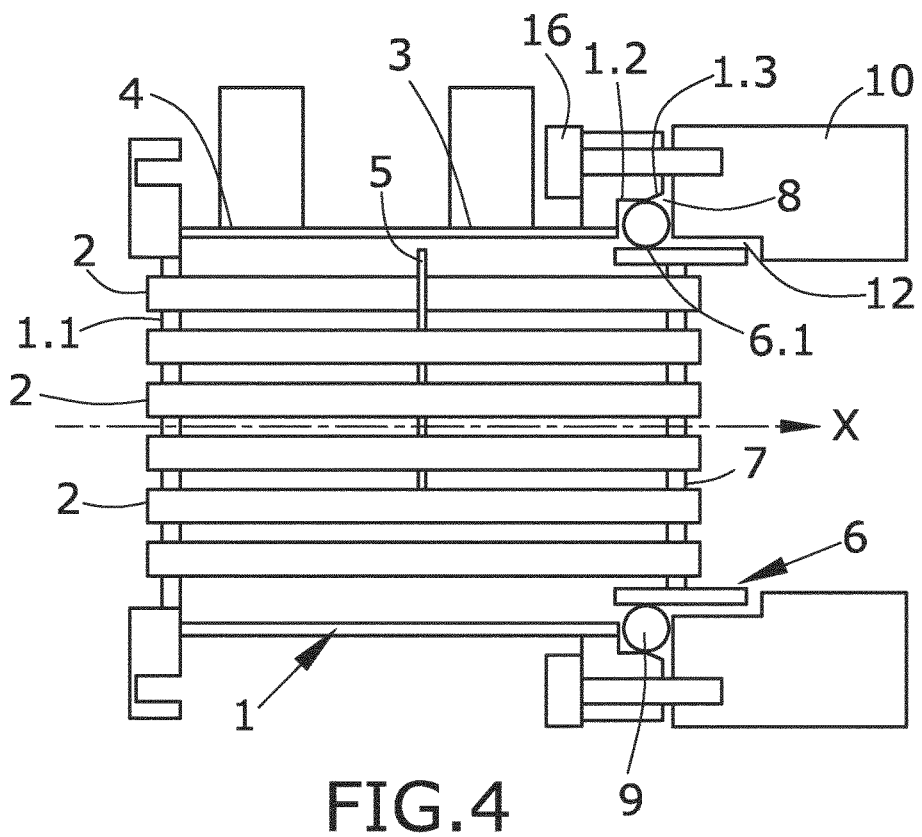

Once the first joint (9) is in the first housing (8), in order for said first joint (9) to seal the first bushing (6) with the shell (1) without an axial shift in the direction opposite the direction of introduction, i.e., in order for the first joint (9) to remain in the first housing (8), in contact with the first bushing (6) and with the shell (1), the floating end also comprises a first closing part (10) around the first bushing (6) but without contacting with it so that the end is in fact floating, as shown in FIG. 4.

The closing parts (10) can be parts having a quite variable nature. In a preferred embodiment, they can consist of a part of the engine itself in which the exchanger is installed. In another example, they can consist of an intermediate flange (11) defining a second housing (14), as explained below. In an additional example, they can be also cold gas boxes which help cool the first joint (9).

The first joint (9) is preferably made of elastomeric materials which do not withstand such high temperatures like metal materials do. For that reason, the first joint (9) should be cooled as much as possible. For this purpose, in a particular example the first joint (9) rests on the portion of the first bushing (6) cooled by the coolant liquid, which in the cross-section of FIG. 1 is the half of the first bushing (6) to the left of the baffle (7).

Other particular embodiments which make the temperature of the first housing (8) suitable for the first joint (9) are those in which the separation (12) between the first closing part (10) and the first bushing (6) has a configuration such that hot gases have difficult access to the first housing (8), and therefore to the first joint (9), through this separation (12). Therefore in a particular embodiment, the first bushing (6) is long enough in the axial direction so that the hot gas does not easily reach the first housing (8). Additionally, following this same line of reasoning, other particular embodiments make the movement of gases between the hot gas conduit prior to the exchanger and the housing for the first joint (9) more difficult: in a particular embodiment, this separation (12) between the first closing part (10) and the first bushing (6) forms a maze which scatters the circulation of gases and therefore reduces the amount of hot gases reaching the first housing (8); as an example, the separation (12) comprises a second bushing (13) therein which hinders the flow of hot gas, without impeding the axial shift of the first bushing (6). In another particular embodiment, the first bushing (6) is shaped such that it likewise makes the flow of hot gas difficult; for example, according to a longitudinal section, it can have a curvature on its surface (6.1) opposite the one attached to the baffle (7), which reduces the size of the separation (12) compared with a straight configuration.

Figure 6:
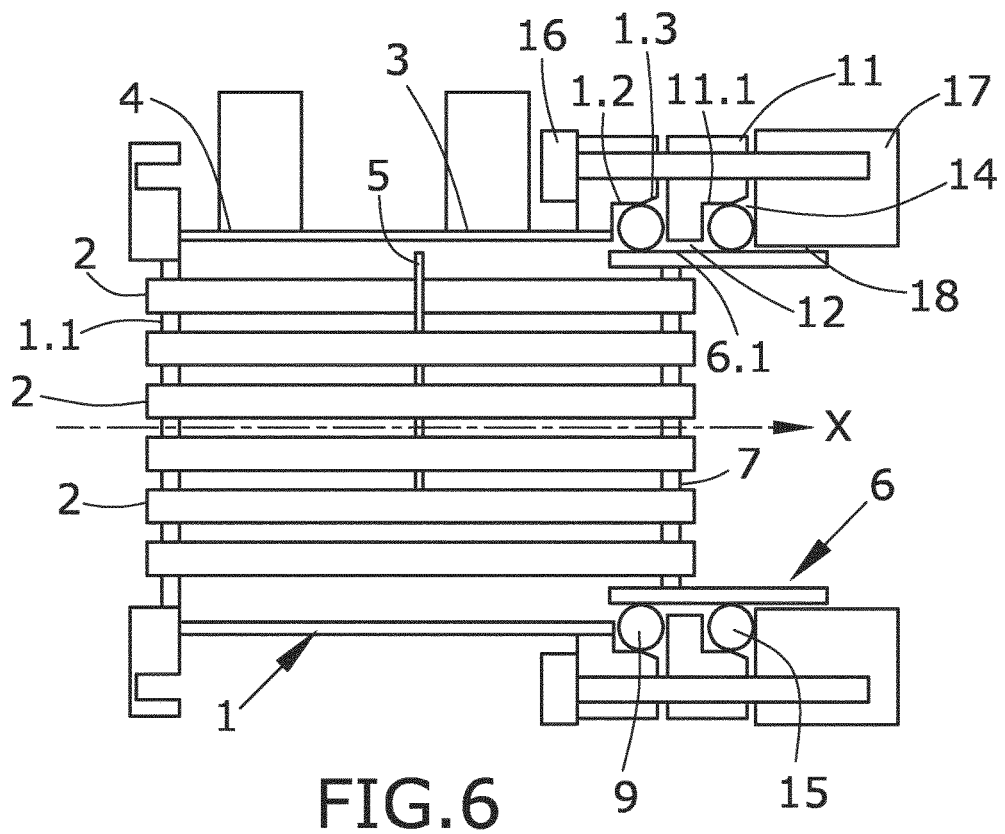
FIG. 6 is a longitudinal section of an exchanger comprising an intermediate flange as a first closing part, a second housing, a second joint and a second closing part.

Likewise, in another particular embodiment, the system comprises an intermediate flange (11) acting as a first closing part of the first joint (9); this intermediate flange (11), which also surrounds the perimeter of the first bushing (6) without contacting it, defines a second corner (11.1) which is L-shaped in the particular embodiment of FIG. 6 showing a longitudinal section view. The second corner (11.1) of the intermediate flange (11) defines, together with the surface (6.1) of the first bushing (6) opposite the one attached to the baffle (7), a second housing (14) with axial access for housing a second joint (15) which, in one embodiment, joins the intermediate flange (11) with the surface (6.1) of the first bushing (6) opposite the one attached to the baffle (7). This second joint (15) acts as a shield between the hot gases coming from the engine and the first joint (9). Although it is subjected to temperatures greater than the usual working temperatures of the materials for manufacturing the joints, which can lead to the loss of properties of the seal between the intermediate flange (11) and the first bushing (6), it performs in any case the function of reducing the temperature of the first joint (9), which is the one that has to be cooled at all times to assure the leak-tightness of the heat exchanger. The axial movement of the second joint (15) once it is introduced in the second housing (14) is blocked by means of a second closing part (17). The variants of second closing parts (17) and of forms of separation (18) between the former and the first bushing (6) are similar to those explained for the case of the first closing part (10) and the first bushing (6).

Likewise, the method of manufacturing an exchanger like the one that has just been described is claimed in dependent claim 14, adding the necessary steps for manufacturing an exchanger with a second joint (15) to those steps that configured the second inventive aspect, explained in the description of the invention section. According to what has just been stated, these additional steps are introducing the second joint (15) into the second housing (14), defined in a flange (11) acting as a first closing part (10), according to the axial direction of the heat exchanger, and immobilizing the second joint (15) by means of a second closing part (17).

In some particular embodiments, the portion of the shell (1) defining the first housing (8), the intermediate flange (11), if there is one, and the closing part (10, 17) are kept integrally attached by means of a screw (16) going through them as shown in FIGS. 4 to 7.

Figure 5:
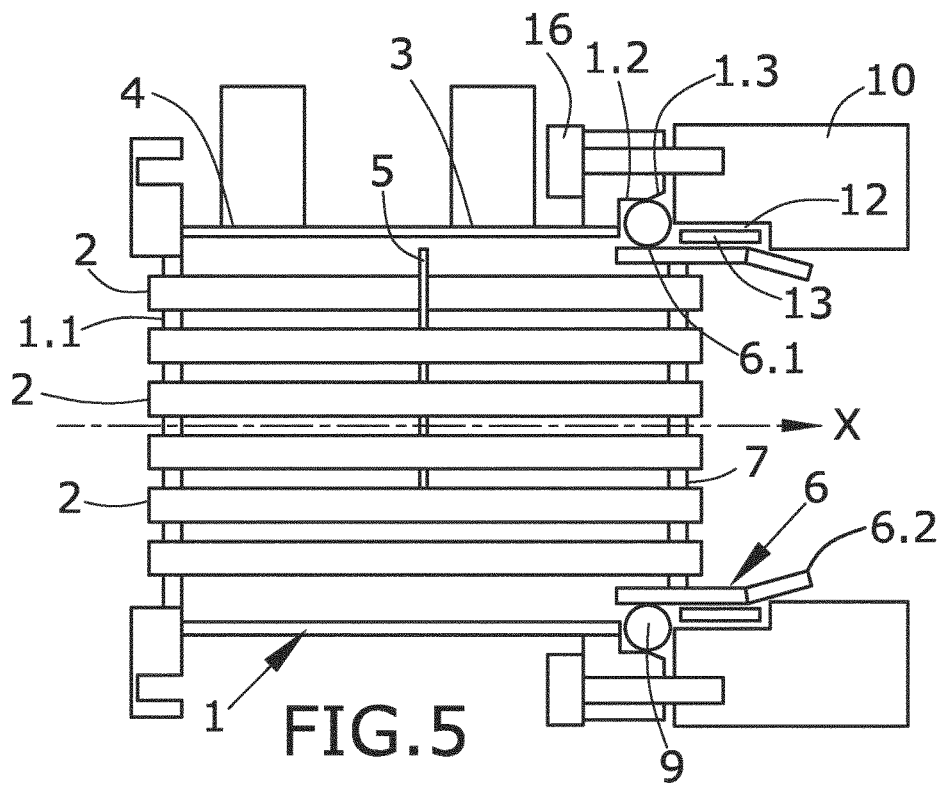
FIG. 5 shows a longitudinal section according to the axis of an exchanger comprising a second bushing in the separation between the first bushing and the first closing part.
Figure 7:
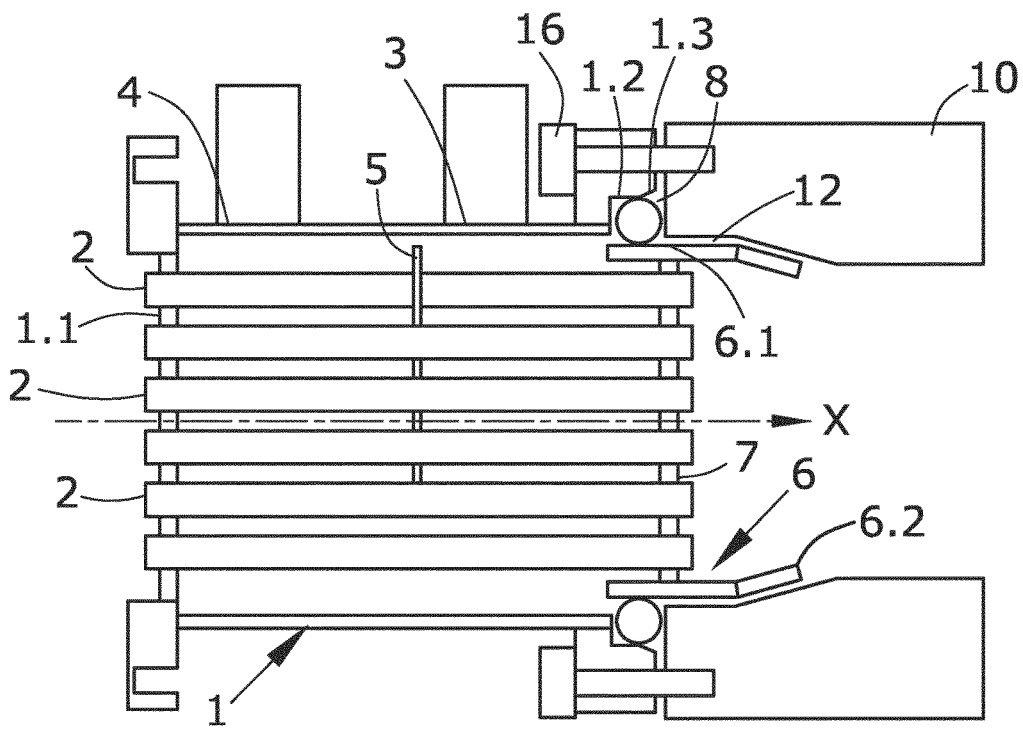
FIG. 7 shows a longitudinal section in which the first bushing has an extension.

On the other hand, in another particular embodiment, the first bushing (6) comprises at its end outside the exchanger, the right end according to FIGS. 5 and 7, an extension (6.2) in the form of a convergent nozzle such that the end of this extension (6.2) is closer to the axis of the exchanger, marked as the X axis in FIGS. 5 and 7, than the first bushing (6). With this particular configuration whereby the outlet for hot gases from the exchanger therefore becomes narrow and concentrated, the flow of gases throughout the inside of the separation (12) between the first bushing (6) and the first closing part (10) towards the first housing (8) is lower; in one embodiment, such configuration reinforces its effect by means of a configuration of the first closing part (10) complementary to that of the nozzle, reducing the area for accessing the separation (12) as shown in FIG. 7.

The invention claimed is:

1. A heat exchanger comprising a shell (1) suitable for the circulation of coolant therein, with a coolant inlet opening (3) and outlet opening (4), and a battery with one or more hollow tubes (2) extending according to an axial direction (X) suitable for conducting gas going through said shell (1) and welded thereto at one of its ends (1.1), characterized in that at the opposite end of the battery:

the latter is welded to an independent baffle (7) that is noncontiguous with respect to the shell (1); and where said baffle (7) comprises a first bushing (6) around its perimeter that is non-contiguous with respect to the shell (1) the surface of which opposite the one attached to the baffle is essentially parallel to the axial direction (X), there is a first housing (8) between the surface (6.1) of the first bushing (6) opposite the one attached to the baffle (7) and the shell (1) such that the access to the first housing (8) is possible according to the axial direction (X) of the exchanger but not according to its radial direction, the attachment between the first bushing (6) and the shell (1) is by means of a first joint (9) housed in the first housing (8) defined between the shell (1) and the first bushing (6), and the exchanger comprises a first independent closing part (10) that is non-contiguous with respect to the first bushing (6), which gives rise to a separation (12) between both, the first closing part (10) preventing the movement of the first joint (9) in the axial direction once this joint (9) is enclosed by at least one inner surface of the first closing part (10) in the first housing (8) defined between the shell (1) and the first bushing (6).

2. The heat exchanger according to claim 1, characterized in that the first closing part (10) is a cold gas box.

3. The heat exchanger according to claim 1, characterized in that the separation (12) between the first closing part (10) and the first bushing (6) forms a maze suitable for making the passage of gases to the first housing (8) difficult.

4. The heat exchanger according to claim 1, characterized in that the separation (12) between the first closing part (10) and the first bushing (6) comprises a second bushing (13) suitable for making the passage of gases to the first housing difficult without preventing the axial shift of the first bushing (6).

5. The heat exchanger according to claim 1, characterized in that the first closing part is a flange (11) defining, together with the surface (6.1) of the first bushing (6) opposite the one attached to the baffle (7), a second housing (14) which houses a second joint (15), and in that it comprises a second closing part (17) preventing, together with the second housing (14), the axial movement of the second joint (15).

6. The heat exchanger according to claim 5, characterized in that the second closing part (17) is a gas manifold.

7. The heat exchanger according to claim 5, characterized in that the separation (18) between the second closing part (17) and the first bushing (6) forms a maze suitable for making the passage of gases to the first housing (8) difficult.

8. The heat exchanger according to claim 5, characterized in that the separation (18) between the second closing part (17) and the first bushing (6) comprises a second bushing (13) suitable for making the passage of gases to the first housing (8) difficult.

9. The heat exchanger according to claim 1, characterized in that the first joint (9) rests on a portion of the first bushing (6) cooled by the coolant circulating inside the shell (1).

10. The heat exchanger according to claim 1, characterized in that the first joint (9) is a O-ring joint, the baffle (7) is circular according to a section transverse to the axial direction (X) of the exchanger, and the first bushing (6) is a ring according to a section transverse to the exchanger.

11. The heat exchanger according to claim 1, characterized in that the first bushing (6) comprises an extension at its end in the form of a convergent nozzle such that its end furthest from the first bushing (6) is closer to the longitudinal axis of the exchanger than the first bushing (6) itself.

12. The heat exchanger according to claim 11, characterized in that the first closing part (10) has a configuration complementary to the convergent nozzle, suitable for reducing the access of gas to the first housing (8).

13. The heat exchanger according to claim 1, characterized in that the portion of the shell (1) defining the first housing (8), the intermediate flange (11), if there is one and the closing part (10, 17) are kept integrally attached by means of a screw (16) going through them.

14. A method for manufacturing heat exchangers according to claim 1 comprising the following steps:

assembling the tubes (2), the shell (1), the baffle (7) and the first bushing (6) by means of welding, introducing the first joint (9) in the first housing (8) according to the axial direction (X) of the heat exchanger, sealing the inside of the shell (1) by means of contacting the first joint (9) with the surface (6.1) of the first bushing (6) opposite the one attached to the baffle (7) and with an inner surface of the shell (1), and immobilizing the first joint (9) by means of a first closing part (10), assuring sealing.

15. The method for manufacturing heat exchangers according to claim 14, wherein the first closing part (10) is a flange (11) defining, together with the first bushing (6), a second housing (14), further comprising the following steps:

introducing a second joint (15) in the second housing (14) according to the axial direction of the heat exchanger, and immobilizing the second joint (15) by means of a second closing part (17).

16. The method according to claim 15, wherein the weld of the tubes (2), the shell (1), the baffle (7) and the first bushing (6) is a brazing-type weld.

\* \* \* \* \*